Patented Mar. 26, 1929.

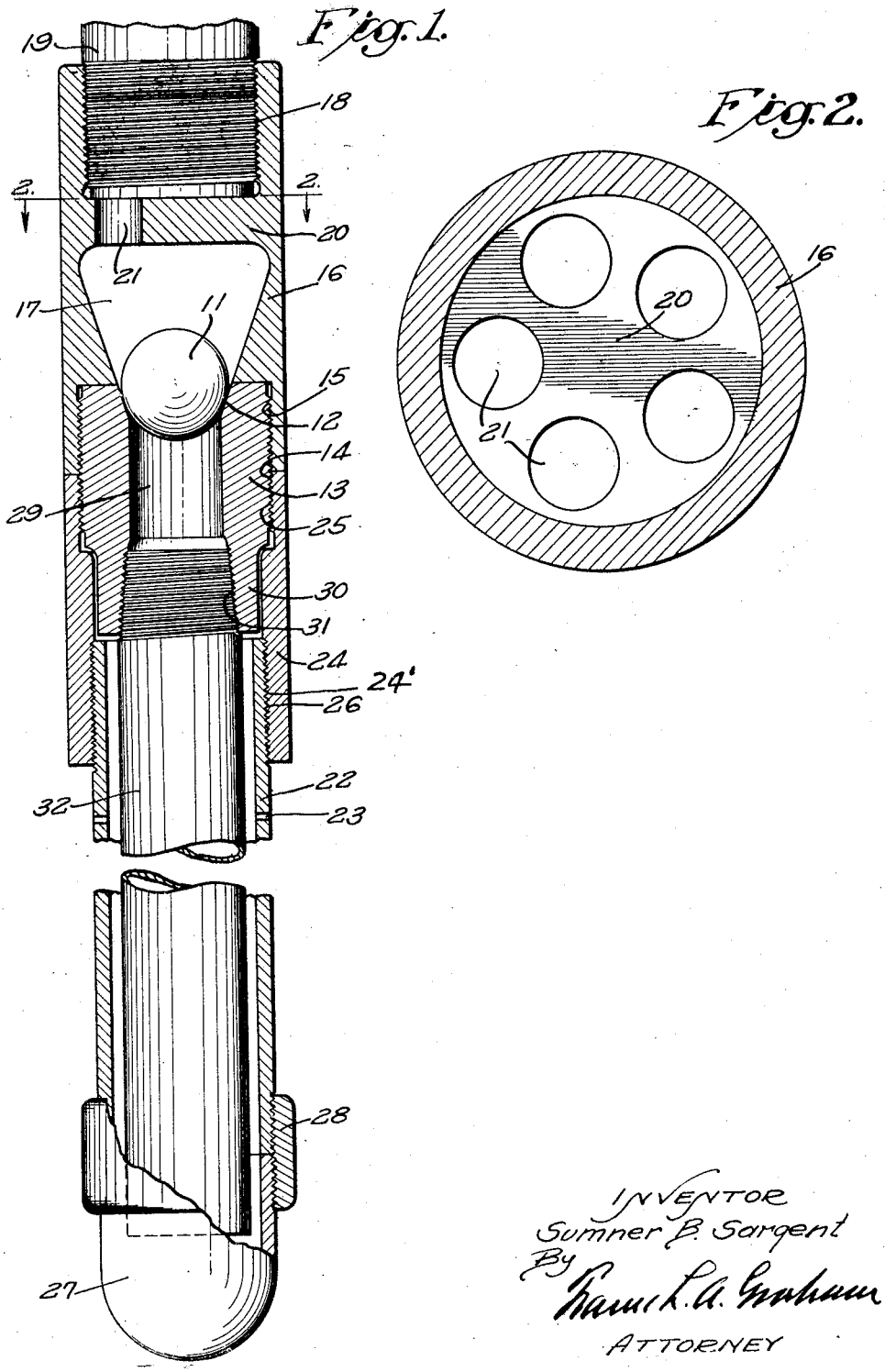

1,706,593

UNITED STATES PATENT OFFICE.

SUMNER B. SARGENT, OF LOS ANGELES, CALIFORNIA.

BLIND-CAGE STANDING-VALVE ORGANIZATION.

Application filed August 26, 1926. Serial No. 131,554.

Ball valves being in especial and deserved favor in certain oil fields, for use in permanent standing-valve organizations secured below pump barrels, it is an object of my present invention to provide an improved type of non-removable cage which not only permits a liberal flow of oil but serves to hold a valve seat and a ball in their intended relationship to one another and to a pump barrel.

It is an object of this invention to provide, for use in the general manner indicated, a valve seat element which is externally threaded in such manner as to adapt the same to carry, below a cage fitting, a leg-carrying fitting,—which may be internally threaded at both ends; and, in a preferred embodiment of my invention, the mentioned seat element, being provided at one end with a conical or other valve seat, may be so constructed that its disconnection from the mentioned cage member constitutes the sole means for the removal of the mentioned valve ball; and the opposite or lower end of the mentioned seat element—which may be provided with a continuous external thread—may comprise or carry an internally threaded extension, suitable for the support of an inner pipe, such as a gas-anchor pipe,—serving, in a known manner, to exclude gas, although admitting oil upwardly past the mentioned valve.

It is thus one object of my invention to provide a valve cage fitting which serves as an internally threaded coupling, for the connection of a valve seat below the pump barrel; and it is another object of my invention to provide a valve seat element which serves as an interior coupling for the attachment of a perforated leg; and said seat element may serve also for the attachment of a gas-anchor pipe, extending downwardly within said leg,—all of said parts being "permanent" in the sense that they are so connected as to be lowered or elevated together, although the unscrewing of a single thread may be effective either for the removal of the mentioned ball (as in the case of undue or unsymmetrical wear) or for the disconnection of the mentioned leg.

Other objects of my invention may be best appreciated from the following description of a typical embodiment thereof, taken in connection with the appended claims and the accompanying drawings, in which Fig. 1 is, for the most part, a median vertical section, with parts broken away.

Fig. 2 is a transverse section, on an enlarged scale, taken substantially as indicated by the arrows 2—2 of Fig. 1.

Referring to the details of that specific embodiment of my invention chosen for purposes of illustration, 11 is a ball valve (for which a "plumbbob" or conical valve, or the like, might be substituted) shown as resting upon a conical seat 12 in a seat element 13. This seat element is shown as provided with a continuous external thread 14, the upper portion of which is engaged by an interior thread 15 upon a cage member 16; and this cage member is shown as provided not only with a concavity or chamber 17, whose lateral walls may be substantially continuous with the mentioned conical seat 12, but with an interiorly threaded portion 18, adapted to receive a correspondingly threaded pump barrel 19, of any preferred character,—the interior of the pump barrel being shown as separated from the valve concavity or chamber 17 by means of a horizontal partition 20, provided with apertures 21.

When the elements above referred to are to be used in connection with a perforated leg, such as the leg 22, shown as provided with lateral openings 23, means such as a leg-connecting fitting 24, shown as interiorly threaded at 24' (to engage the external thread 14 upon the valve seat element 13) and at 26 (to receive the threaded upper end of said perforated leg) may be employed in the general manner indicated,—the lower end of the mentioned leg being shown as closed by a "bull-nose" 27, secured by a coupling 28. If desired, as when precautions are required to prevent the admission of gas through the central passage 29 controlled by the valve 11, the lower end of the seat element 13, or an extension 30, shown as integral therewith, may be internally threaded, as at 31, to receive an inner or gas-anchor pipe 32,—shown as imperforate, although open at its lower end and as terminating below the lowermost of the oil inlet ports 23.

As to the operation of the described organization, it will be understood that the ball 11, or its equivalent, is intended to rise incidentally to each upward movement of a plunger (not shown) reciprocated within the barrel 19, or its equivalent, the upward movement of said valve being limited by its contact with the apertured partition 20; and the diameters of the passages 21 and 29, and also the diameter of the chamber 17 (shown as wider than the barrel 19) are intended to be such as to permit a very free upward flow of oil,—the described perforated leg 22 and gas-anchor pipe 32 cooperating, when employed, to admit oil although excluding gas; and the described organization may be supported either by suspension from above or by contact of the bull-nose 27, or its equivalent, with the bottom of a well.

It will be recognized that the described construction, simpler and more rugged than analogous constructions in current use, permits either the removal, as for replacement, of the valve ball 11, or its equivalent, or the removal of the perforated leg 22, upon the unthreading of a single joint; and that the described valve seat element and valve cage member, each being provided with a thread at or near each end thereof, and said valve seat element being shown as provided with a continuous external thread, are adapted to serve respectively and cooperatively as exterior and interior coupling elements, holding all the mentioned parts in their intended relationships.

Moreover, my embodiment of the standing valve in a fitting of larger diameter than the pump barrel allows the use of a very large fluid opening; and this large opening is especially advantageous in wells of low fluid level. In such wells, the incoming fluid does not have to have great velocity; but, by the use of the described construction providing a wide valve opening, more oil can be forced through than in the case of the small (common) type of construction, assuming the same head.

The lateral walls of the cage member being substantially continuous with the conical seat 12, I consider an important feature, as by so forming these parts, the seat itself is protected to a large extent from any pounding action of the ball 11, this is due to the fact that the greatest movement of the ball 11 laterally is in the chamber 17, the walls of which chamber guide the ball in its downward movement to a proper seating position.

Although I have herein described a single complete embodiment of my invention, it should be understood not only that various features thereof may be independently used but also that numerous modifications might be made by those skilled in the art to which this case relates, without the slightest departure from the spirit and scope of this invention, as the same is indicated above and in the following claims.

I claim as my invention:

1. A standing valve organization comprising: a valve cage member internally threaded at both ends and provided with a frustral conical valve cavity which is upwardly terminated by an apertured partition, the lower end of said cage being internally threaded to receive a valve seat, and a valve seat mounted in said internally threaded section, said valve seat having a seating surface substantially continuous with the inner surface of said frustral conical valve cavity.

2. A standing valve organization embodying: a pump barrel; a valve seat; and a valve cage member internally threaded at both ends and provided with a frustral conical valve cavity which is upwardly terminated by an apertured partition; said cage member being a coupling by which a valve seat is secured relatively to a pump barrel, said valve seat having a seating surface which is substantially continuous with the inner surface of said valve cavity.

3. A standing valve organization embodying: a pump barrel; a valve seat element provided with means for its support exclusively from a valve cage; and a valve cage constituting means to couple the said seat element to said pump barrel, said cage being internally provided with a frustral conical cavity having a surface substantially continuous with the seating surface of said seat element, and exceeding said barrel in outside diameter.

4. For use in combination with a pump barrel, a standing valve organization comprising: a valve seat element provided with means for its support exclusively from a valve cage; and a valve cage constituting means to couple the said seat element to a pump barrel, said valve seat element being provided with a conically ground valve seat, and said cage being provided with an interior surface continuous therewith.

5. A standing valve organization embodying: a cage member; a leg fitting; a gas anchor; a valve; and a valve seat element provided with an external thread adapting it to serve as an internal coupling and an internal thread, said external thread being continuous, and portions of said thread being engageable respectively by said cage member and by said leg fitting, and said internal thread being engageable by said gas anchor.

6. A standing valve organization comprising: a valve; and a valve seat element having a frustral conical valve seat and provided with a continuous external thread adapting it to serve as an internal coupling, and with an internal thread.

7. A standing valve organization embodying: a cage member; a perforated leg; a valve; and a valve seat element having a frustral conical valve seat and provided with a continuous external thread adapting it to serve as an internal coupling, and with an internal thread; portions of said external thread being engageable respectively by said cage member and by means for the support of said perforated leg.

8. A standing valve organization embodying: a cage member; a perforated leg; a gas anchor; a valve; and a valve seat element having a frustral conical valve seat and provided with a continuous external thread adapting it to serve as an internal coupling, and with an internal thread; portions of said external thread being engageable respectively by said cage member and by means for the support of said perforated leg, and said internal thread being engageable by a gas-anchor pipe extending below the perforations in said perforated leg.

9. A standing valve organization comprising: a valve; and a valve seat element provided with a continuous external thread adapting it to serve as an internal coupling, and with an internal thread; and means comprising downwardly extending concentric tubular members secured by said external and internal threads, for admitting oil while excluding gas from admission to said valve.

In testimony whereof, I have hereunto set my hand at Los Angeles, California, this 20th day of August, 1926.

SUMNER B. SARGENT.